(12) United States Patent
Gu (10) Patent No.: US 11,604,570 B2
(45) Date of Patent: Mar. 14, 2023

(54) METHOD, DEVICE, APPARATUS, AND STORAGE MEDIUM FOR CONTROLLING TOUCH OPERATION MODE

(71) Applicants: GUANGZHOU SHIYUAN ELECTRONIC TECHNOLOGY COMPANY LIMITED, Guangzhou (CN); GUANGZHOU SHIZHEN INFORMATION TECHNOLOGY CO., LTD., Guangzhou (CN)

(72) Inventor: Yichang Gu, Guangzhou (CN)

(73) Assignees: GUANGZHOU SHIYUAN ELECTRONIC TECHNOLOGY COMPANY LIMITED, Guangzhou (CN); GUANGZHOU SHIZHEN INFORMATION TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/497,872

(22) Filed: Oct. 8, 2021

(65) Prior Publication Data

US 2022/0027031 A1   Jan. 27, 2022

Related U.S. Application Data (63) Continuation of application No. PCT/CN2019/120856, filed on Nov. 26, 2019.

(30) Foreign Application Priority Data

Apr. 10, 2019 (CN) .......................... 201910286510.2

(51) Int. Cl.
*G06F 3/0484* (2022.01)
*G06F 3/04883* (2022.01)

(52) U.S. Cl.
CPC ........ *G06F 3/0484* (2013.01); *G06F 3/04883* (2013.01)

(58) Field of Classification Search
None
See application file for complete search history.

(56) References Cited

U.S. PATENT DOCUMENTS

2008/0284741 A1\* 11/2008 Hsu ........................ G06F 3/0488
                                                                         345/173
2011/0244898 A1   10/2011 Matsui et al.
(Continued)

FOREIGN PATENT DOCUMENTS

| CN | 1912819 A | 2/2007 |
| CN | 101963863 A | 2/2011 |

(Continued)

OTHER PUBLICATIONS

European Search Report issued in corresponding international application No. PCT/CN2019/120856, dated Apr. 29, 2022, 8 pages.
(Continued)

*Primary Examiner* — Tuan S Nguyen
(74) *Attorney, Agent, or Firm* — Bayes PLLC (57) ABSTRACT

The present disclosure discloses a method, a device, an apparatus, and a non-transitory readable storage medium of controlling a touch operation mode. The method includes responding to a mode trigger operation, selecting a touch operation mode corresponding to the mode trigger operation as an initial touch operation mode, monitoring an operation duration in the initial touch operation mode, and according to the operation duration, determining and controlling the execution of a current touch operation mode.

5 Claims, 5 Drawing Sheets

(56) References Cited

U.S. PATENT DOCUMENTS

| | | | | |
|---|---|---|---|---|
| 2015/0084877 A1* | 3/2015 | Wang | ............... | G06F 3/04886 345/173 |
| 2016/0043718 A1* | 2/2016 | Tsou | ............... | H03K 17/962 307/125 |
| 2017/0351394 A1* | 12/2017 | Sumida | ............... | G06F 3/0485 |
| 2019/0004695 A1* | 1/2019 | Zhang | ............... | G06F 3/0416 |

FOREIGN PATENT DOCUMENTS

| | | |
|---|---|---|
| CN | 103513817 A | 1/2014 |
| CN | 105045508 A | 11/2015 |
| CN | 106569692 A | 4/2017 |
| CN | 106990893 A | 7/2017 |
| CN | 107390931 A | 11/2017 |
| CN | 107422901 A | 12/2017 |
| CN | 107533430 A | 1/2018 |
| CN | 108446052 A | 8/2018 |
| CN | 105045508 B | 9/2018 |
| CN | 109189259 A | 1/2019 |
| CN | 110007800 A | 7/2019 |
| CN | 107422901 B | 5/2020 |
| CN | 110007800 B | 11/2020 |
| CN | 107390931 B | 5/2021 |
| CN | 109189259 B | 8/2021 |
| EP | 2669785 A2 | 12/2013 |
| EP | 2701054 A2 | 2/2014 |
| EP | 2703985 A1 | 3/2014 |

OTHER PUBLICATIONS

International Search Report issued in corresponding international application No. PCT/CN2019/120856, dated Nov. 26, 2019, 2 pages.

International Search Report issued in corresponding international application No. 201910286510.2, dated Mar. 4, 2020, 9 pages.

Extended European Search Report issued in corresponding European Application No. 19924147.2, dated Apr. 29, 2022, 8 pages.

* cited by examiner

METHOD, DEVICE, APPARATUS, AND STORAGE MEDIUM FOR CONTROLLING TOUCH OPERATION MODE

CROSS-REFERENCE TO RELATED APPLICATION

The present disclosure is a continuation of International Application No. PCT/CN2019/120856, filed on Nov. 26, 2019, which claims the benefit of priority to Chinese Patent Application No. 201910286510.2, filed on Apr. 10, 2019, both of which are incorporated in by reference in their entireties.

TECHNICAL FIELD

The embodiments of the present disclosure relate to the field of computer technology, for example, to a method, a device, an apparatus, and a storage medium for controlling touch operation mode.

BACKGROUND

An interactive whiteboard is a digital teaching demonstration apparatus that replaces an ordinary whiteboard. The interactive whiteboard combines touch technology, and can realize human-computer interaction through fingers or an input device matched with the interactive whiteboard.

When a user performs a touch operation with a finger or an input device matched with the interactive whiteboard, the interactive whiteboard may trigger one touch point to respond to the touch operation, or may trigger multiple touch points to respond to the touch operation. In the process of a touch operation, the number of the triggered touch points can also be increased from one to multiple, or reduced from multiple to one. In short, the touch operation on the interactive whiteboard by a user can randomly trigger any touch point.

However, due to functional requirements, developers define the response of different touch operation modes according to the triggering of different numbers of touch points. For example, the triggering of a single touch point can control the interactive whiteboard to enter a touch writing mode. For another example, the triggering of two or more touch points can control the interactive whiteboard to enter a corresponding application setting mode. Therefore, when the user performs a touch operation, if the number of triggered touch points is changed, the touch operation mode will be switched. However, when the user performs a touch operation, if a touch point of a corresponding position is triggered by the interference of other touches (such as the touch of a sleeve or a wrist on the interactive whiteboard), it will cause a wrong switching of the touch operation mode, which affects the user's experience of using the interactive whiteboard.

SUMMARY

This summary is provided to introduce a selection of embodiments in a simplified form that are further described below in the Detailed Description. This summary is not intended to exclusively identify key features or essential features of the claimed subject matter, nor is it intended as an aid in determining the scope of the claimed subject matter.

The embodiments of the present disclosure provide a method, a device, an apparatus, and a storage medium for controlling touch operation mode, so as to realize accurate switching of the touch operation mode.

In an embodiment, the present disclosure provides a method for controlling touch operation mode. The method includes responding to a received mode trigger operation, selecting a touch operation mode corresponding to the mode trigger operation as a triggered initial touch operation mode, monitoring an operation duration in the initial touch operation mode, and according to the operation duration, determining and controlling the execution of a current touch operation mode.

In an embodiment, the present disclosure further provides a device for controlling touch operation mode. The device includes a responding module configured to respond to a received mode trigger operation, a selecting module configured to select a touch operation mode corresponding to the mode trigger operation as a triggered initial touch operation mode, a monitoring module of operation duration configured to monitor an operation duration in the initial touch operation mode, and a determining module configured to, according to the operation duration, determine and control the execution of a current touch operation mode.

In an embodiment, the present disclosure further provides an apparatus for controlling touch operation mode. The apparatus includes one or more processors, and a storage device configured to store one or more programs. The one or more programs are executed by the one or more processors, so that the one or more processors implement a method for controlling touch operation mode provided by the embodiments of the present disclosure.

In an embodiment, the present disclosure further provides a computer-readable storage medium, on which a computer program is stored. When the computer program is executed by a processor, a method for controlling touch operation mode provided by the embodiments of the present disclosure is implemented.

BRIEF DESCRIPTION OF DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

DETAILED DESCRIPTION

Hereinafter, the present disclosure will be described with reference to the drawings and embodiments. The embodiments described herein are only used to describe the present disclosure, but not to limit the present disclosure. For ease of description, the drawings only show a part of the structure related to the present disclosure, but not all of the structure.

Some exemplary embodiments are described as processes or methods depicted by flowcharts. Although the flowchart describes various operations (or steps) as sequential processing, many of the operations can be implemented in parallel, concurrently, or simultaneously. In addition, the order of various operations can be rearranged. The processing may be terminated when the operation is completed, but may also have additional steps which are not included in the drawings. The processing may correspond to methods, functions, procedures, subroutines, subprograms, and the like.

Embodiment 1

Figure 1:
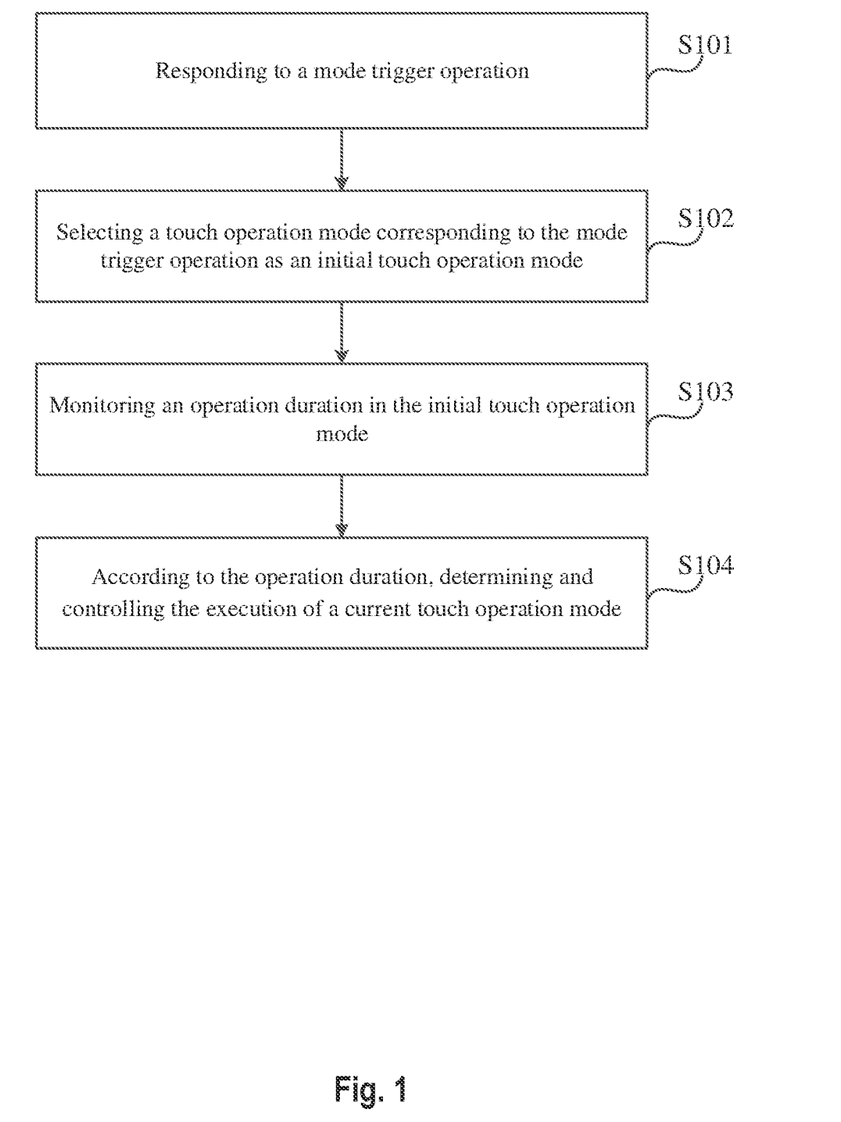
FIG. 1 is a schematic flowchart of a method for controlling a touch operation mode, according to some embodiments of the present disclosure.

FIG. 1 is a schematic flowchart of a method for controlling a touch operation mode according to Embodiment 1 of the present disclosure. The method may be suitable for improving the accuracy of switching a touch operation mode. In an embodiment, the method may be suitable for guaranteeing that, during the process of using a device for controlling a touch operation mode by a user, when the touch operation is changed, the effective switching of the touch operation mode is guaranteed. The method can be executed by the device for controlling the touch operation mode, wherein the device can be implemented by software and/or hardware, and is generally integrated on an apparatus for controlling a touch operation mode.

The apparatus for controlling the touch operation mode may be composed of two or more physical entities, or may be composed of one physical entity. The apparatus for controlling the touch operation mode can be a computer, a mobile phone, a tablet, a projector or an interactive whiteboard, etc. with an electronic whiteboard function. In some embodiments, an interactive whiteboard used as the apparatus for controlling the touch operation mode is taken as an example for description.

The interactive whiteboard may be an apparatus that controls the content displayed on the whiteboard through the touch technology to realize human-computer interaction. The interactive whiteboard can integrate one or more functions such as projectors, electronic whiteboards, screens, loudspeaker boxes, TV sets, and video conferencing terminals. In an embodiment, a display device of the interactive whiteboard may be a capacitive screen, a resistive screen, or an electromagnetic screen. The user can perform touch operations on the interactive whiteboard with a finger or a stylus.

In an embodiment, the interactive whiteboard is installed with its own application software, and at the same time, it is also installed with application software downloaded from a third-party device or a server. Thereinto, the type and content of the application software can be set according to actual conditions. Generally, the application software has a function of an electronic whiteboard, and can realize the following functions by the function of an electronic whiteboard, such as writing, drawing, erasing, selecting and roaming. Different functions correspond to different touch operation modes, and also correspond to different triggering methods.

In this embodiment, the touch operation modes of the interactive whiteboard can be divided into explicit modes and implicit modes. The explicit modes include a single-pen touch writing mode, a dual-pen touch writing mode, a single-finger touch writing mode, an intelligent mode, a touch erasing mode, an image erasing mode and/or a selection mode. The implicit modes include a touch erasing mode (such as gesture erasing) and/or a touch setting mode (such as roaming mode). In the roaming mode, a movement operation and a zoom operation can coexist.

The apparatus for controlling the touch operation mode usually adopts the infrared touch technology. Infrared recognition has a certain recognition height. When an object enters this height range, it will cause input, which will cause the wrong switching of the touch operation mode. The execution timing of the method for controlling the touch operation mode in this embodiment may be the time when the user triggers the mode trigger operation. After receiving the mode trigger operation, the method disclosed in this embodiment can be executed to guarantee the effective switching of the touch operation mode.

As shown in FIG. 1, the method for controlling the touch operation mode provided in Embodiment 1 of the present disclosure includes the following steps.

S101, responding to a received mode trigger operation.

In this embodiment, the mode trigger operation can be understood as an operation for triggering a touch operation mode.

The triggering form of the mode trigger operation is not limited. In this embodiment, the apparatus for controlling the touch operation mode that executes the method for controlling the touch operation mode may have a touch function, so when the user uses the apparatus for controlling the touch operation mode, the mode trigger operation may be triggered by performing operations such as clicking and double-clicking at a corresponding position of the apparatus for controlling the touch operation mode by a touch manner, such as using a finger or a stylus. For example, the apparatus for controlling the touch operation mode can set a corresponding physical button or virtual button for the explicit mode, and the user can trigger the mode trigger operation by clicking the physical button or the virtual button.

In this step, the corresponding touch operation mode can be determined by analyzing the mode trigger operation received by the apparatus for controlling the touch operation mode. The content included in the mode trigger operation is not limited, and can be set according to the actual situation. For example, the mode trigger operation may include duration, operation position, and/or operation area, etc. When the mode trigger operation is analyzed, the corresponding touch operation mode can be determined based on the content included in the mode trigger operation. The corresponding relationship between the mode trigger operation and the touch operation mode may be predetermined.

For example, in this embodiment, different virtual buttons can be set to correspond to different touch operation modes. After the user clicks the virtual button to trigger the mode trigger operation, the touch operation mode corresponding to the mode trigger operation is triggered.

In an embodiment, the apparatus for controlling the touch operation mode in this embodiment can divide the touch operation modes into explicit modes and implicit modes. When the mode is switched, this embodiment may only consider the switching process from the explicit mode to the implicit mode. After switching from the explicit mode to the implicit mode, no matter the number of touch points increases or decreases, it will not return to the explicit mode until no touch points are detected, that is, the finger or stylus of the user is lifted up.

In an embodiment, when the user uses the apparatus for controlling the touch operation mode, the apparatus may first be touched to enter the explicit mode, and then enter the implicit mode. Therefore, the mode trigger operation in this step can be regarded as an operation that triggers the entry into the explicit mode.

S102, selecting a touch operation mode corresponding to the mode trigger operation as a triggered initial touch operation mode.

In this embodiment, the touch operation mode can be understood as a function mode of the apparatus for controlling the touch operation mode. The touch operation modes include a touch writing mode, a touch roaming mode, a touch erasing mode, and/or a touch selection mode. Each touch operation mode can be operated by a single touch point or by multiple touch points. For example, the touch operation modes corresponding to the single touch point operation may include a touch writing mode, a touch selection mode, and/or a touch erasing mode, etc. The touch operation modes corresponding to the multiple touch points may include a touch roaming mode and/or a touch zoom mode, etc. Switching from one touch operation mode to another touch operation mode can be regarded as a mode switching.

A start operation of the touch operation mode may refer to that the finger or stylus of the user starts to contact the display device of the apparatus for controlling the touch operation mode. The end operation of the touch operation mode may refer to that the finger or stylus of the user leaves the display device of the apparatus for controlling the touch operation mode.

In an embodiment, different touch operation modes can set trigger conditions based on the start operation. For example, the explicit mode can be defined that it is triggered when a mode trigger operation is received, the implicit mode can be defined that it is triggered when a preset starting condition is met in the explicit mode. The preset starting condition can be set according to the situation, which is not limited herein.

In this embodiment, the initial touch operation mode can be understood as a touch operation mode triggered by a mode trigger operation. The initial touch operation mode may be any touch operation mode of the explicit modes.

After the mode trigger operation is analyzed, in this step, the touch operation mode corresponding to the mode trigger operation can be used as the initial touch operation mode triggered by the apparatus for controlling the touch operation mode. After the initial touch operation mode is triggered, the user can use the initial touch operation mode to perform operations.

S103, monitoring an operation duration in the initial touch operation mode.

In this embodiment, the operation duration can be understood as the duration of maintaining the initial touch operation mode.

After the initial touch operation mode is triggered, the operation duration of maintaining the initial touch operation mode can be monitored in real time in this step, so as to determine a corresponding strategy based on the operation duration to determine the current touch operation mode.

This step does not limit the means for monitoring the operation duration. For example, the operation duration of the initial touch operation mode can be monitored through a timer set in the apparatus for controlling the touch operation mode.

S104, according to the operation duration, determining and controlling the execution of a current touch operation mode.

In this embodiment, the current touch operation mode can be understood as a touch operation mode that needs to be performed by the apparatus for controlling the current touch operation mode.

In the process of using the apparatus for controlling the touch operation mode by the user, it may need to enter different touch operation modes to complete a desired function. In this embodiment, the current touch operation mode is determined by monitoring the operation duration, which can avoid wrong switching of the touch operation mode caused by that—the apparatus for controlling the touch operation mode changes the touch operation mode when it detects the change of the touch point.

In an embodiment, after the operation duration is monitored, this step may determine the current touch operation mode according to the operation duration and the preset time threshold. The preset time threshold can be understood as a preset time threshold used to limit whether to maintain the current touch operation mode in the explicit mode. In this step, different touch operation modes can also be determined as the current touch operation mode according to different operation durations. The corresponding relationship between the operation duration and the corresponding touch operation mode may be determined in advance according to the relationship between each touch operation mode and the user's usage habits, which is not limited herein.

Optionally, according to the operation duration, determining and controlling the execution of the current touch operation mode may include comparing the operation duration with a preset time threshold, and according to a comparison result, determining the current touch operation mode, and controlling the execution of the current touch operation mode.

When determining the current touch operation mode according to the operation duration and the preset time threshold, the size of the operation duration and the preset time threshold may be compared to determine whether to maintain the current touch operation mode in the explicit mode. After the current touch operation mode is maintained in the explicit mode, the interference of misoperation can be effectively reduced.

For example, assuming that the initial touch operation mode is a single-pen touch writing mode, if the operation duration is greater than the preset time threshold, it can be considered that the current user has entered a stable writing state, and the initial touch operation mode can be kept as the current touch operation mode. Or, a more optimized touch operation mode (such as a two-pen touch writing mode) corresponding to the initial touch operation mode can be selected as the current touch operation mode to improve user operation efficiency. In an embodiment, if the operation duration is greater than the preset time threshold, the initial touch operation mode is kept. At this time, even if the number of touch points is changed, the touch operation mode will not be switched.

If the operation duration is less than or equal to the preset time threshold, the explicit mode can be switched to the implicit mode, or a touch operation mode in the explicit mode can be switched to another touch operation mode in the explicit mode. Thereinto, when switching is performed between explicit modes, it can be triggered by a mode trigger operation. When the explicit mode is switched to the implicit mode, the current touch operation mode can be determined by combining the trigger means corresponding to the implicit mode. The trigger means corresponding to the implicit mode is not limited herein. For example, it can be touch information generated by the user's touch, or can be a voice message.

Embodiment 1 of the present disclosure provides a method for controlling a touch operation mode. By using the above method, the current touch operation mode can be determined and the execution thereof can be controlled based on the operation duration corresponding to the initial touch operation mode triggered by the mode trigger operation. Limiting the current touch operation mode through the operation duration not only avoids the wrong switching of the touch operation mode caused by the interference of other touches, but also guarantees the effective switching of the touch operation mode, thereby reducing the interference of misoperation, and improving the user's experience.

Embodiment 2

Figure 2:
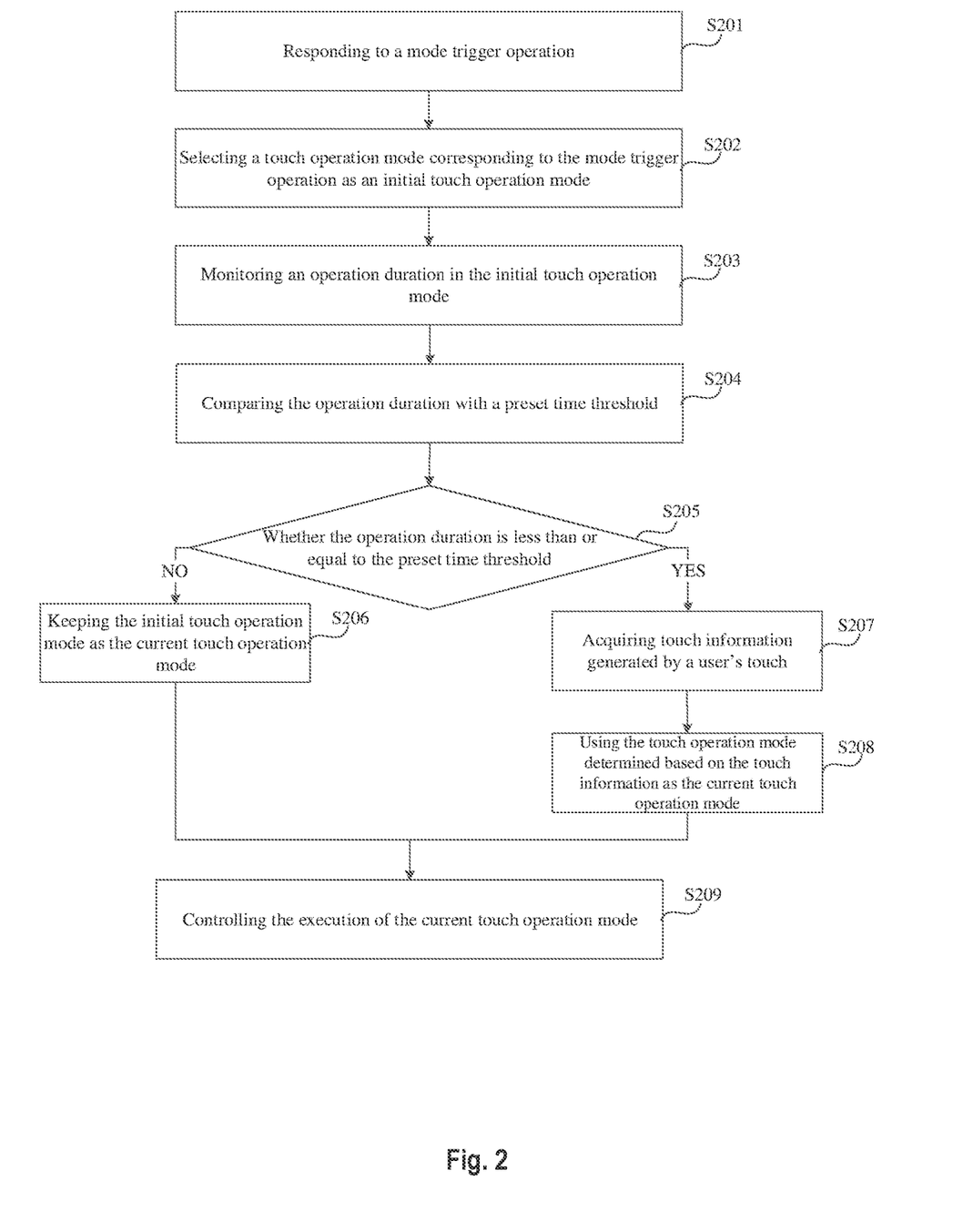
FIG. 2 is a schematic flowchart of a method for controlling a touch operation mode, according to some embodiments of the present disclosure.

FIG. 2 is a schematic flowchart of a method for controlling a touch operation mode according to Embodiment 2 of the present disclosure. The Embodiment 2 is an optional embodiment based on the above-mentioned embodiment. In this embodiment, according to a comparison result, determining the current touch operation mode may include, if the operation duration is less than or equal to the preset time threshold, acquiring touch information generated by a user's touch, and using the touch operation mode determined based on the touch information as the current touch operation mode.

In an embodiment, according to the comparison result, determining the current touch operation mode may further include, if the operation duration is greater than the preset time threshold, keeping the initial touch operation mode as the current touch operation mode.

Reference to Embodiment 1 can be made for non-exhaustive contents of this embodiment.

As shown in FIG. 2, the method for controlling a touch operation mode provided in Embodiment 2 of the present disclosure includes the following steps.

S201, responding to a received mode trigger operation.

S202, selecting a touch operation mode corresponding to the mode trigger operation as a triggered initial touch operation mode.

S203, monitoring an operation duration in the initial touch operation mode.

S204, comparing the operation duration with a preset time threshold.

S205, judging whether the operation duration is less than or equal to the preset time threshold; if not, executing S206; if yes, executing S207.

In this step, it is determined whether the current touch operation mode is maintained in the explicit mode by judging whether the operation duration is less than or equal to the preset time threshold. That is, if the operation duration is less than or equal to the preset time threshold, the current touch operation mode can be determined by taking into account the touch information, and S207 can be executed. If the operation duration is greater than the preset time threshold, the current touch operation mode can be maintained as the explicit mode, and S206 can be executed.

S206, keeping the initial touch operation mode as the current touch operation mode, and executing S209.

When the operation duration is greater than the preset time threshold, in this step, the initial touch operation mode can be kept as the current touch operation mode. In an embodiment, when the initial touch operation mode is kept as the current touch operation mode, the mode switching operation may not be performed. That is, the initial touch operation mode is maintained.

S207, acquiring touch information generated by a user's touch.

In this embodiment, the touch information can be understood as information generated by operating the apparatus for controlling the touch operation mode by the user. For example, the touch information can be triggered by clicking a physical button or a virtual button of the apparatus for controlling the touch operation mode by the user. The physical button and the virtual button can be used to trigger the implicit mode.

When the operation duration is less than or equal to the preset time threshold, the touch information can be acquired in this step to determine the current touch operation mode.

The manner of acquiring the touch information may depend on the manner of triggering the touch information. For example, if the display device equipped for the apparatus for controlling the touch operation mode is a touch screen, the touch information in this apparatus may include a touch position, the number of touch points, a touch duration, and/or a touch area. If the touch information is triggered by the physical button of the apparatus for controlling the touch operation mode, a state of each physical button can be acquired in this step to determine the touch information. At this time, the touch information can carry an identifier of the physical button, so as to determine the touch operation mode corresponding to the physical button.

S208, using the touch operation mode determined based on the touch information as the current touch operation mode.

After the touch information is determined, in this step the current touch operation mode can be determined based on the touch information. Different touch information can correspond to different touch operation modes. The corresponding relationship between the touch information and the touch operation mode may be set according to the operation manner of each touch operation mode, which is not limited herein.

If the touch operation mode determined by the touch information is the initial touch operation mode, the initial touch operation mode is kept as the current touch operation mode. If the touch operation mode determined by the touch information is not the initial touch operation mode, the apparatus for controlling the touch operation mode switches the touch operation mode.

S209, controlling the execution of the current touch operation mode.

After determining the current touch operation mode, this step can cause the apparatus for controlling the touch operation mode to execute the current touch operation mode for usage of the user.

Embodiment 2 of the present disclosure provides a method for controlling a touch operation mode, which describes the operation of determining the current touch operation mode. By using this method, it is possible to determine whether to keep the initial touch operation mode as the current touch operation mode based on the operation duration of the initial touch operation mode and the preset time threshold. If the operation duration is greater than the preset time threshold, the initial touch operation mode is kept as the current touch operation mode. That is, the switching of touch operation mode is not performed, thereby avoiding wrong switching of the touch operation mode. If the operation duration is less than or equal to the preset time threshold, the current touch operation mode is determined by taking into account the touch information, thereby avoiding that the touch operation mode is switched only through the touch points. It can be seen that this method is more accurate when switching the touch operation mode, which reduces the interference of misoperation and improves the user's experience.

This embodiment provides an optional embodiment. In this optional embodiment, the touch information includes the number of touch points and a touch area. Accordingly, using the touch operation mode determined based on the touch information as the current touch operation mode includes, if the touch area is greater than a preset area threshold, using a touch erasing mode as the current touch operation mode; otherwise, using the touch operation mode determined based on the number of touch points as the current touch operation mode.

Thereinto, the number of touch points can be understood as the number of operation points by the user on the touch screen of the apparatus for controlling the touch operation mode. The touch area can be understood as, when the user performs a touch operation, the touched area of the apparatus for controlling the touch operation mode. The preset area threshold can be understood as a preset area threshold for triggering the touch erasing mode. The touch erasing mode can be understood as gesture erasing. When the touch area is greater than the preset area threshold, the touch erasing mode can be triggered. That is, the touch erasing mode can be used as the current touch operation mode. If the touch area is not greater than the preset area threshold, it can indicate that there is no need to perform gesture erasing at present, and the current touch operation mode can be determined by the number of touch points.

Different numbers of touch points can correspond to different touch operation modes. The corresponding relationship between the number of touch points and the touch operation mode can be determined according to the operation means of the touch operation mode, or can be set arbitrarily as long as the corresponding touch operation mode can be determined according to the number of operation points.

On the basis of the above-mentioned embodiment, optionally, using the touch operation mode determined based on the number of touch points as the current touch operation mode includes, if the number of touch points is one, keeping the initial touch operation mode as the current touch operation mode, and if the number of touch points is at least two, determining the current touch operation mode according to the duration of maintaining the at least two touch points touched by the user.

Thereinto, the maintaining duration can be understood as the duration of maintaining at least two touch points touched by the user in a phase of acquiring the touch information.

The method for controlling the touch operation mode in this embodiment can be applied to a scenario where the apparatus for controlling the touch operation mode switches from the explicit mode to the implicit mode. The implicit modes in this embodiment may include a touch erasing mode and/or a touch setting mode. When it is judged that the touch erasing mode is not to be switched, it is possible to judge whether to perform the switching of the touch setting mode.

In an embodiment, the touch setting mode needs to be triggered by at least two touch points. Therefore, in this embodiment, the current touch operation mode can be determined by judging the number of touch points. If the number of touch operation points is one, it can be considered that there is no need to enter the touch setting mode at present, and the initial touch operation mode is directly kept as the current touch operation mode. A means of keeping the initial touch operation mode as the current touch operation mode can be referred to the means of, when the operation duration is greater than a preset time threshold, keeping the initial touch operation mode as the initial touch operation mode.

If the number of touch operation points is at least two, in order to avoid misoperation, the current touch operation mode may be determined according to the duration of maintaining at least two touch points touched by the user. When the maintaining duration is shorter, it can be considered that there is no need to switch to the touch setting mode; otherwise, it can be considered that it is necessary to switch to the touch setting mode.

On the basis of the above-mentioned embodiment, optionally, determining the current touch operation mode according to the duration of maintaining the at least two touch points touched by the user includes, monitoring the duration of maintaining the at least two touch points touched by the user, and if the maintaining duration is greater than a switching time threshold, using the touch setting mode as the current touch operation mode; otherwise, keeping the initial touch operation mode as the current touch operation mode.

Thereinto, the switching time threshold can be understood as a time threshold for setting the switching of the touch operation mode. According to the switching time threshold, it is possible to determine whether to switch the initial touch operation mode to the touch setting mode. The touch setting mode can be understood as a mode for interface setting, such as roaming mode. Roaming mode can roam the selected interface outside the display device of the apparatus for controlling the touch operation mode, without displaying it, and when needed, the touch setting mode is triggered and the required interface is dragged back into the display device of the apparatus for controlling the touch operation mode.

When the current touch operation mode is determined according to the duration of maintaining at least two touch points touched by the user, the maintaining duration can be monitored. The monitoring means is not limited—for example, the maintaining duration can be monitored through a timer.

After the maintaining duration is monitored, the maintaining duration and the switching time threshold can be compared to determine the current touch operation mode. If the maintaining duration is greater than the switching time threshold, it is indicated that the touch setting mode needs to be triggered, and the touch setting mode is used as the current touch operation mode; otherwise, the switching of the touch operation mode may not be performed. That is, the touch operation mode is kept as the current touch operation mode.

Embodiment 3

Figure 3:
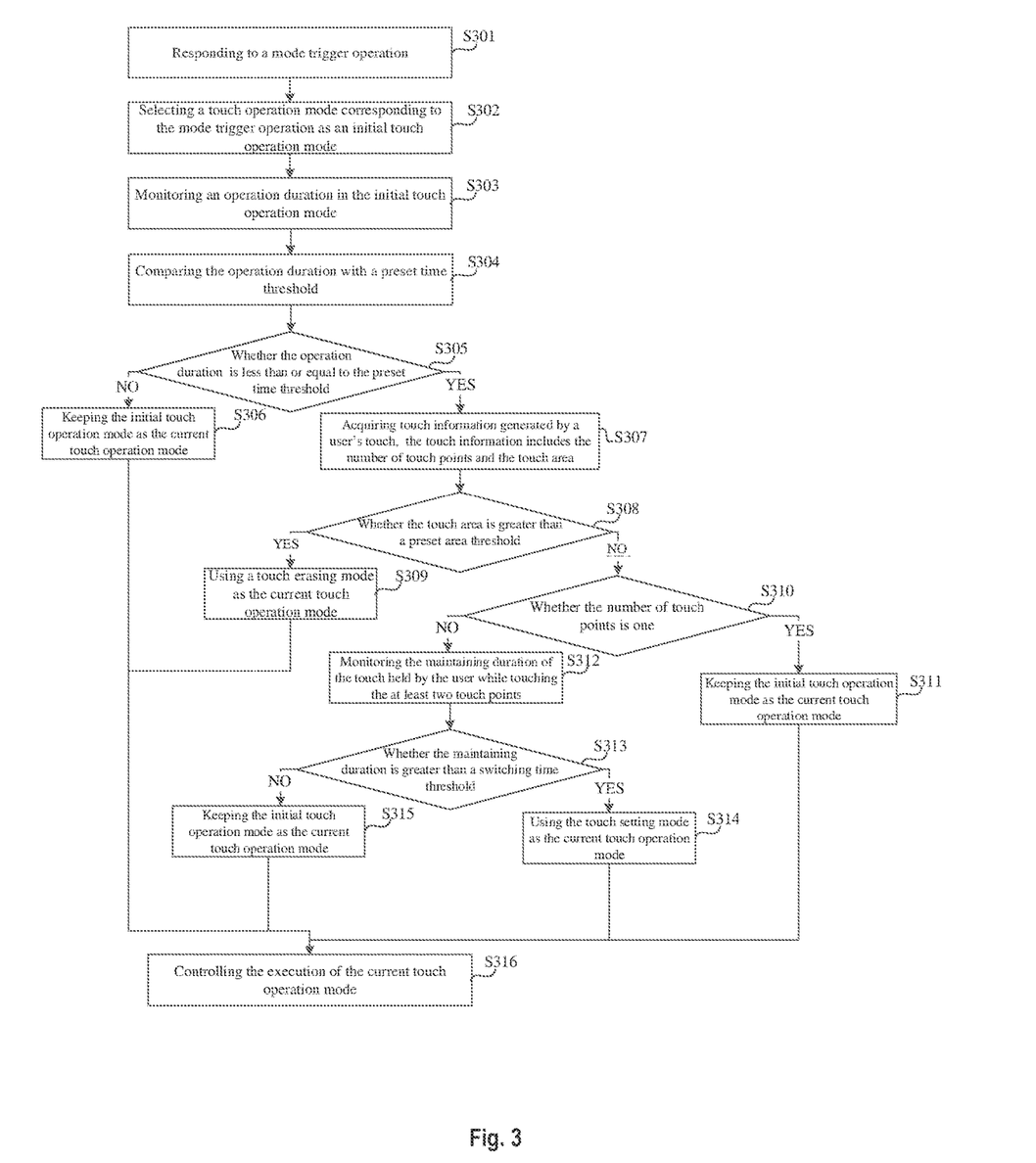
FIG. 3 is a schematic flowchart of a method for controlling a touch operation mode, according to some embodiments of the present disclosure.

FIG. 3 is a schematic flowchart of a method for controlling a touch operation mode according to Embodiment 3 of the present disclosure. This embodiment may be based on the above-mentioned embodiments and provides an optional example. Reference to the above-mentioned embodiments can be made for non-exhaustive contents of this embodiment.

As shown in FIG. 3, the method for controlling a touch operation mode provided in Embodiment 3 of the present disclosure includes the following steps.

S301, responding to a received mode trigger operation.

S302, selecting a touch operation mode corresponding to the mode trigger operation as a triggered initial touch operation mode.

S303, monitoring an operation duration in the initial touch operation mode.

S304, comparing the operation duration with a preset time threshold.

S305, judging whether the operation duration is less than or equal to the preset time threshold; if not, executing S306; if yes, executing S307.

S306, keeping the initial touch operation mode as the current touch operation mode, and executing S316.

S307, acquiring touch information generated by a user's touch, wherein the touch information includes the number of touch points and the touch area.

S308, judging whether the touch area is greater than a preset area threshold; if not, executing S309; if yes, executing S310.

S309, using a touch erasing mode as the current touch operation mode, and executing S316.

S310, judging whether the number of touch points is one; if yes, executing S311; if not, executing S312.

S311, keeping the initial touch operation mode as the current touch operation mode, and executing S316.

S312, monitoring the maintaining duration of the touch held by the user while touching the at least two touch points.

S313, judging whether the maintaining duration is greater than a switching time threshold; if yes, executing S314; if not, executing S315.

S314, using the touch setting mode as the current touch operation mode, and executing S316.

S315, keeping the initial touch operation mode as the current touch operation mode.

S316, controlling the execution of the current touch operation mode.

This embodiment will be exemplarily described hereinafter. The method for controlling the touch operation mode in this embodiment can be understood as a method for anti-interference of the touch operation of an interactive whiteboard, which may include the following steps.

Step 1, performing a touch operation (mode trigger operation) on the whiteboard software by a user. The interactive whiteboard responds to the touch operation of the user and enters the corresponding mode A for the user to operate.

Step 2, judging whether the operation of the current mode A has continued for a period of time T1; if yes, entering step 7; otherwise, entering step 3.

Step 3, judging a current input source, that is, acquiring touch information for judgment. If it is judged that the area of the touch point (that is, the touch area) is not greater than a certain threshold, entering step 4; otherwise, entering step 8.

Step 4, judging the number of touch points. If there are multiple touch points, entering step 5. If there is one touch point, entering step 7.

Step 5, judging whether the duration of maintaining the multiple touch points is greater than T2. If it is greater than T2, entering step 6; otherwise, entering step 7.

Step 6, switching to a touch roaming mode until an end operation is satisfied.

Step 7, keeping the current operation mode of the user without switching, and continuing to receive mode trigger operations until the end operation is satisfied.

Step 8, switching to a touch erasing mode until the end operation is satisfied. In an embodiment, if the mode A is the touch erasing mode, the operation is not rolled back, and the operations in other explicit modes are rolled back.

For example, based on steps 1-8, this embodiment can set the mode A as a touch writing mode, with T1 of 100 ms and T2 of 50 ms. When the user starts writing with a single point, if the number of touch points increases to 2 or more within the time of T1, and the duration of maintaining multiple points exceeds 50 ms—for example, multiple touch points enter at 20th ms, and the multiple touch points are maintained through the 70th ms—it will switch to the touch roaming mode; otherwise, the touch writing mode is still kept.

Embodiment 3 of the present disclosure provides a method for controlling a touch operation mode. By using this method, it is possible to effectively determine whether to keep the initial touch operation mode as the current touch operation mode based on the operation duration. On this basis, it can be determined whether to switch the touch operation mode by taking into account the number of touch points, the touch area, and the maintaining duration, which achieves the purpose of filtering the operation, reduces the interference of misoperation, and improves the user's experience. In addition, the complex interaction problem caused by hard switching is avoided through the touch area, the number of touch points, and the maintaining duration.

Embodiment 4

Figure 4:
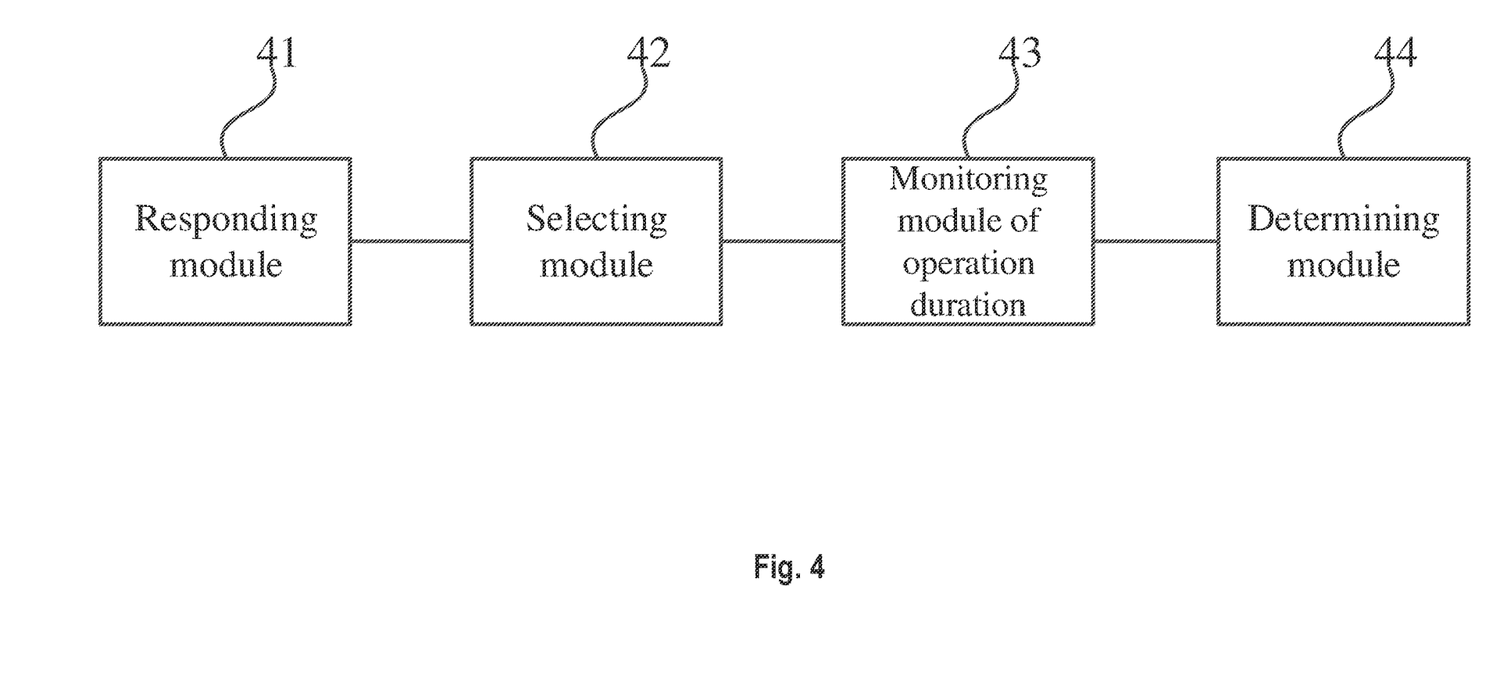
FIG. 4 is a schematic structure diagram of a device for controlling a touch operation mode, according to some embodiments of the present disclosure.

FIG. 4 is a schematic structure diagram of a device for controlling a touch operation mode according to Embodiment 4 of the present disclosure. The device may be suitable for improving the accuracy of switching the touch operation mode. In an embodiment, the device may be suitable for guaranteeing that, during the process of using the device for controlling the touch operation mode by the user, when the touch operation is changed, the touch operation mode is effectively switched. The device can be implemented by software and/or hardware, and is generally integrated into an apparatus for controlling a touch operation mode (such as an interactive whiteboard).

As shown in FIG. 4, the device includes a responding module 41, a selecting module 42, a monitoring module of operation duration 43, and a determining module 44.

Thereinto, the responding module 41 is configured to respond to a received mode trigger operation.

The selecting module 42 is configured to select a touch operation mode corresponding to the mode trigger operation as a triggered initial touch operation mode.

The monitoring module of operation duration 43 is configured to monitor an operation duration in the initial touch operation mode.

The determining module 44 is configured to, according to the operation duration, determine and control the execution of a current touch operation mode.

In this embodiment, the device responds to the received mode trigger operation through the response module 41, selects a touch operation mode corresponding to the mode trigger operation as a triggered initial touch operation mode through the selection module 42, and monitors an operation duration in the initial touch operation mode through the monitoring module of operation duration 43, and according to the operation duration, determines and controls the execution of the current touch operation mode through the determination module 44.

This embodiment provides a device for controlling a touch operation mode, which can determine and control the execution of the current touch operation mode based on the operation duration corresponding to the initial touch operation mode triggered by the mode trigger operation. Limiting the current touch operation mode by operation duration not only avoids the wrong switching of the touch operation mode caused by the interference of other touches, but also ensures the effective switching of the touch operation mode, reduces the interference of misoperation, and improves the user's experience.

In an embodiment, the determining module 44 includes a comparing sub-module configured to compare the operation duration with a preset time threshold, and a determining sub-module configured to, according to a comparison result, determine the current touch operation mode, and control the execution of the current touch operation mode.

On the basis of the above-mentioned embodiments, when determining the current touch operation mode according to the comparison result, the determining sub-module may be configured to, if the operation duration is less than or equal to the preset time threshold, acquire touch information generated by a user's touch, and use the touch operation mode determined based on the touch information as the current touch operation mode.

On the basis of the above-mentioned embodiments, the touch information may include the number of touch points and a touch area; accordingly, when using the touch operation mode determined based on the touch information as the current touch operation mode, the determining sub-module may be configured to, if the touch area is greater than a preset area threshold, use a touch erasing mode as the current touch operation mode; otherwise, use the touch operation mode determined based on the number of touch points as the current touch operation mode.

On the basis of the above-mentioned embodiments, when using the touch operation mode determined based on the number of touch points as the current touch operation mode, the determining sub-module may be configured to—if the number of touch points is one—keep the initial touch operation mode as the current touch operation mode, and—if the number of touch points is at least two—determine the current touch operation mode according to the duration of maintaining the at least two touch points touched by the user.

In an embodiment, when determining the current touch operation mode according to the duration of maintaining the at least two touch points touched by the user, the determining sub-module may be configured to monitor the duration of maintaining the at least two touch points touched by the user, and—if the duration is greater than a switching time threshold—use the touch setting mode as the current touch operation mode; otherwise, keep the initial touch operation mode as the current touch operation mode.

In an embodiment, when determining the current touch operation mode according to a comparison result, the determining sub-module may be configured to, if the operation duration is greater than the preset time threshold, keep the initial touch operation mode as the current touch operation mode.

The above-mentioned device for controlling the touch operation mode can execute the method provided in any embodiment of the present disclosure, and has the corresponding functional modules and effects to execute the method.

Embodiment 5

Figure 5:
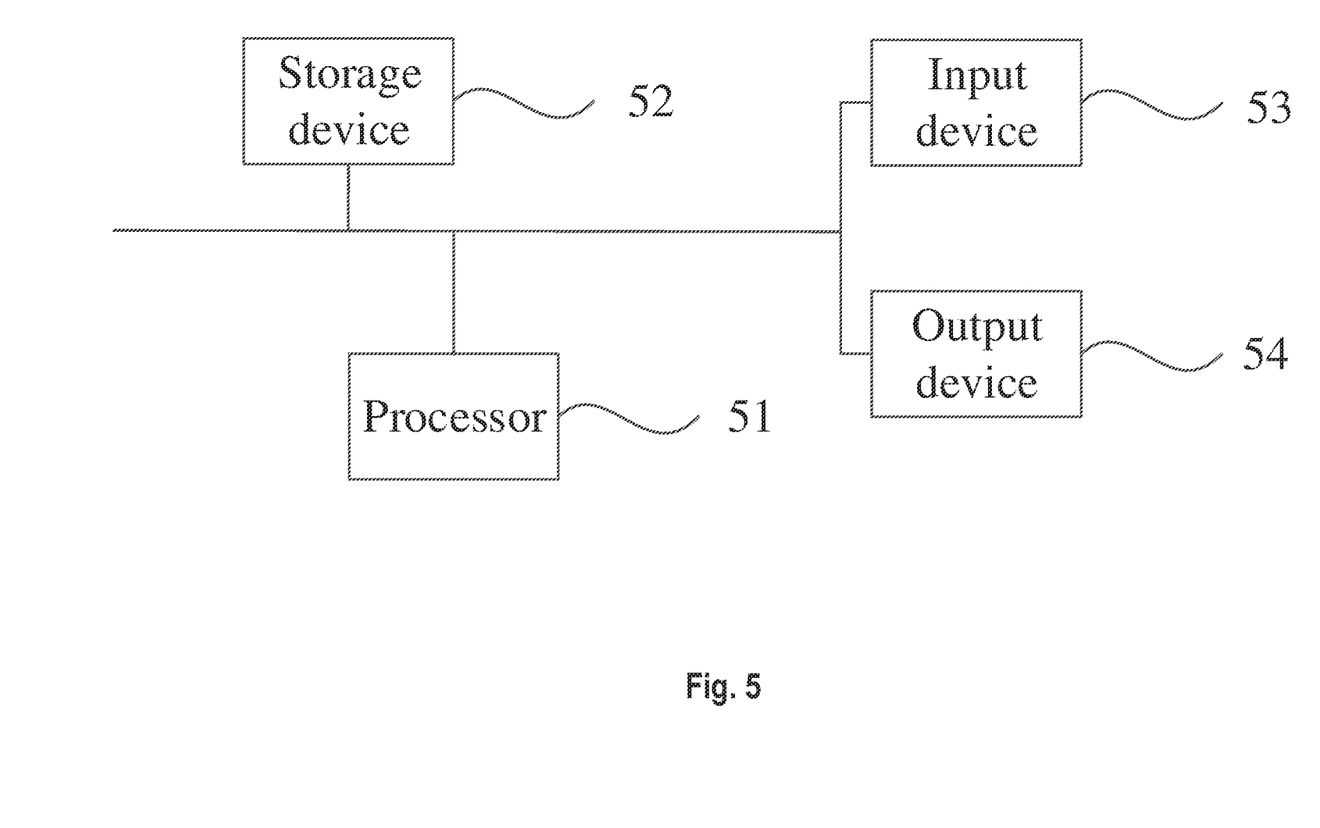
FIG. 5 is a schematic structure diagram of an apparatus for controlling a touch operation mode, according to some embodiments of the present disclosure.

FIG. 5 is a schematic structure diagram of an apparatus for controlling a touch operation mode according to Embodiment 5 of the present disclosure. As shown in FIG. 5, the apparatus for controlling a touch operation mode provided by Embodiment 5 includes one or more processors 51, and a storage device 52. The processor 51 in the apparatus for controlling the touch operation mode may be one or more. FIG. 5 takes one processor 51 as an example. The storage device 52 is configured to store one or more programs. The one or more programs being executed by the one or more processors 51, so that the one or more processors 51 implement any one of the methods described in the embodiments of the present disclosure.

The apparatus for controlling the touch operation mode may further include an input device 53 and an output device 54.

The processor 51, the storage device 52, the input device 53, and the output device 54 in the apparatus for controlling the touch operation mode may be connected by bus or other means. In FIG. 5, the connection by bus is taken as an example.

The storage device 52 in the device for controlling the touch operation mode is used as a computer-readable storage medium, which can be used to store one or more programs. The programs can be software programs, computer-executable programs, and modules, such as the program instructions/modules (for example, the modules in the apparatus for controlling the touch operation mode shown in FIG. 4, including the responding module 41, the selecting module 42, the monitoring module of operation duration 43, and the determining module 44) corresponding to the method provided in the embodiments of the present disclosure. The processor 51 executes various functional applications and data processing of the interactive whiteboard by running the software programs, instructions, and modules stored in the storage device 52, that is, implements the methods in the above-mentioned method embodiments.

The storage device 52 may include a storage program area and a storage data area. Thereinto, the storage program area may store an application program required by an operating system or at least one function. The storage data area may store data created according to the use of the apparatus for controlling the touch operation mode. In addition, the storage device 52 may include a high-speed random access memory, and may also include a non-volatile memory, such as at least one magnetic disk storage device, a flash memory device, or other non-volatile solid-state storage devices. In some examples, the storage device 52 may include memories remotely provided with respect to the processor 51, and these remote memories may be connected to the device through a network. Examples of the above-mentioned network include the Internet, an intranet, a local area network, a mobile communication network, and combinations thereof.

The input device 53 may be configured to receive input digital or character information, and to generate key signal input related to user settings and function control of the interactive whiteboard. The output device 54 may include a display device such as a display screen.

Moreover, when one or more programs included in the above-mentioned interactive whiteboard are executed by the one or more processors 51, the programs perform the following operations, including responding to a received mode trigger operation, selecting a touch operation mode corresponding to the mode trigger operation as a triggered initial touch operation mode, monitoring an operation duration in the initial touch operation mode, and according to the operation duration, determining and controlling the execution of a current touch operation mode.

Embodiment 6

The Embodiment 6 of the present disclosure provides a computer-readable storage medium, on which a computer program is stored, and when the computer program is executed by a processor, a method for controlling a touch operation mode being implemented. The method includes responding to a received mode trigger operation, selecting a touch operation mode corresponding to the mode trigger operation as a triggered initial touch operation mode, monitoring an operation duration in the initial touch operation mode, and according to the operation duration, determining and controlling the execution of a current touch operation mode.

Optionally, when the program is executed by the processor, it may also be used to execute the method provided in any embodiment of the present disclosure.

The computer storage medium in the embodiments of the present disclosure may adopt any combination of one or more computer-readable media. The computer-readable medium may be a computer-readable signal medium or a computer-readable storage medium. The computer-readable storage medium may be, for example, an electrical, magnetic, optical, electromagnetic, infrared, or semiconductor system, device, or apparatus, or a combination of any of the above mentioned. Computer-readable storage media include electrical connections with one or more wires, portable computer disks, hard disks, random access memory (RAM), read only memory (ROM), and Erasable Programmable Read Only Memory (EPROM), flash memory, optical fiber, portable CD-ROM, optical storage device, magnetic storage device, or any suitable combination of the above mentioned. The computer-readable storage medium may be any tangible medium that contains or stores a program, and the program may be used by or in combination with an instruction execution system, device, or apparatus.

The computer-readable signal medium may include a data signal propagated in baseband or as a part of a carrier wave, and computer-readable program code is carried therein. This propagated data signal can take many forms, including electromagnetic signals, optical signals, or any suitable combination of the above. The computer-readable signal medium may also be any computer-readable medium other than a computer-readable storage medium. The computer-readable medium may send, propagate, or transmit the program for use by or in combination with the instruction execution system, device, or apparatus.

The program code contained on the computer readable medium can be transmitted by any suitable medium, including wireless, wire, optical cable, radio frequency (RF), etc., or any suitable combination of the above mentioned.

The computer program code used to perform the operations of the present disclosure can be written in one or more programming languages or a combination thereof. The programming languages include object-oriented programming languages—such as Java, Smalltalk, C++, and also conventional procedural programming language-such as "C" language or similar programming language. The program code can be executed entirely on a user's computer, partly on user's computer, executed as an independent software package, partly on user's computer and partly executed on a remote computer, or entirely executed on the remote computer or server. In the case of a remote computer, the remote computer can be connected to user's computer through any kind of network-including Local Area Network (LAN) or Wide Area Network (WAN)—which can be connected to user's computer, or an external computer (for example, using an Internet service provider to connect via the Internet).

The foregoing description of the specific embodiments can be readily modified and/or adapted for various applications. Therefore, such adaptations and modifications are intended to be within the meaning and range of equivalents of the disclosed embodiments, based on the teaching and guidance presented herein.

The breadth and scope of the present disclosure should not be limited by any of the above-described exemplary embodiments, but should be defined only in accordance with the following claims and their equivalents.

What is claimed is:

1. A method for controlling a touch operation mode, comprising:
    in response to a mode trigger operation received on an interactive whiteboard, selecting a touch operation mode corresponding to the mode trigger operation as an initial touch operation mode;
    monitoring an operation duration of the initial touch operation mode; and
    comparing the operation duration with a preset time threshold; and
    according to a comparison result, determining a current touch operation mode and controlling execution of the current touch operation mode;
    wherein according to the comparison result, determining the current touch operation mode comprises:
    when the operation duration is less than or equal to the preset time threshold, acquiring touch information generated by a user's touch, and using the touch operation mode determined based on the touch information as the current touch operation mode; otherwise, keeping the initial touch operation mode as the current touch operation mode;
    wherein the touch information comprises a number of touch points and a touch area; and wherein,
    in response to the number of touch points being at least two, monitoring duration of maintaining the at least two touch points generated by the user; and
    in response to the maintaining duration being greater than a switching time threshold, using a touch setting mode as the current touch operation mode; otherwise, keeping the initial touch operation mode as the current touch operation mode.

2. The method according to claim 1, wherein using the touch operation mode determined based on the touch information as the current touch operation mode comprises:
    in response to the touch area being greater than a preset area threshold, using a touch erasing mode as the current touch operation mode; otherwise,
    using the touch operation mode determined based on the number of touch points as the current touch operation mode.

3. The method according to claim 2, wherein using the touch operation mode determined based on the number of touch points as the current touch operation mode comprises:
    in response to the number of touch points being one, keeping the initial touch operation mode as the current touch operation mode.

4. A device for controlling a touch operation mode, comprising:
    a computer readable storage medium and one or more processors,
    wherein the computer readable storage medium is configured to store at least one instruction, and the at least one instruction, when executed by the one or more processors, causes the device to
    in response to a mode trigger operation received on an interactive whiteboard, select a touch operation mode corresponding to the mode trigger operation as an initial touch operation mode, monitor an operation duration of the initial touch operation mode; and compare the operation duration with a preset time threshold; and according to a comparison result, determine a current touch operation mode, and control execution of the current touch operation mode;

wherein according to the comparison result, determine the current touch operation mode comprises:

when the operation duration is less than or equal to the preset time threshold, acquire touch information generated by a user's touch, and use the touch operation mode determined based on the touch information as the current touch operation mode; otherwise, keep the initial touch operation mode as the current touch operation mode;

wherein the touch information comprises a number of touch points and a touch area; and wherein in response to the number of touch points being at least two, monitor duration of maintaining the at least two touch points generated by the user; and in response to the maintaining duration being greater than a switching time threshold, use a touch setting mode as the current touch operation mode; otherwise, keep the initial touch operation mode as the current touch operation mode.

5. A non-transitory readable storage medium having at least one executable instruction stored thereon, when executed by one or more processors of a device, causes the processors to perform operations, the operations comprising:

in response to a mode trigger operation received on an interactive whiteboard, selecting a touch operation mode corresponding to the mode trigger operation as an initial touch operation mode;

monitoring an operation duration of the initial touch operation mode; and comparing the operation duration with a preset time threshold; and according to a comparison result, determining a current touch operation mode, and controlling execution of the current touch operation mode;

wherein according to the comparison result, determining the current touch operation mode comprises:

when the operation duration is less than or equal to the preset time threshold, acquiring touch information generated by a user's touch; and using the touch operation mode determined based on the touch information as the current touch operation mode; otherwise, keeping the initial touch operation mode as the current touch operation mode;

wherein the touch information comprises a number of touch points and a touch area; and wherein in response to the number of touch points being at least two, monitoring duration of maintaining the at least two touch points generated by the user; and in response to the maintaining duration being greater than a switching time threshold, using a touch setting mode as the current touch operation mode; otherwise, keeping the initial touch operation mode as the current touch operation mode.

\* \* \* \* \*